US011447184B2

(12) United States Patent
Takahashi et al.

(10) Patent No.: US 11,447,184 B2
(45) Date of Patent: Sep. 20, 2022

(54) VEHICLE BODY LOWER STRUCTURE

(71) Applicants: TOYOTA JIDOSHA KABUSHIKI KAISHA, Aichi (JP); SUBARU CORPORATION, Tokyo (JP)

(72) Inventors: Naoki Takahashi, Miyoshi (JP); Katsuya Ooshima, Tokyo-to (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 27 days.

(21) Appl. No.: 17/131,764

(22) Filed: Dec. 23, 2020

(65) Prior Publication Data

US 2021/0221435 A1 Jul. 22, 2021

(30) Foreign Application Priority Data

Jan. 17, 2020 (JP) .............................. JP2020-006329

(51) Int. Cl.
*B62D 25/02* (2006.01)
*B62D 21/15* (2006.01)
*B62D 27/02* (2006.01)

(52) U.S. Cl.
CPC ........... *B62D 25/025* (2013.01); *B62D 21/15* (2013.01); *B62D 21/157* (2013.01); *B62D 27/02* (2013.01)

(58) Field of Classification Search
CPC ........................ B62D 25/025; B62D 21/157; B60Y 2306/01; B60K 1/04; B60K 2001/0438
USPC ........................ 296/209, 187.12; 180/68.5
See application file for complete search history.

(56) References Cited

U.S. PATENT DOCUMENTS

| 10,913,340 | B2 * | 2/2021 | Tsuyuzaki ............... B60K 1/04 |
| 2016/0288636 | A1 | 10/2016 | Kamimura et al. |
| 2019/0023323 | A1 | 1/2019 | Uehata |

FOREIGN PATENT DOCUMENTS

| JP | 2013256265 A | 12/2013 | |
| JP | 201918760 A | 2/2019 | |
| WO | 2015083487 A1 | 6/2015 | |
| WO | WO-2019096675 A1 * | 5/2019 | ............... B60K 1/04 |

* cited by examiner

*Primary Examiner* — Dennis H Pedder
(74) *Attorney, Agent, or Firm* — Hauptman Ham, LLP

(57) ABSTRACT

A vehicle body lower structure may include: a rocker arranged in a lower lateral part of a vehicle body and extending along a front-rear direction of the vehicle body; a power source arranged adjacent to the rocker; a first energy absorbing member arranged under the rocker; a second energy absorbing member arranged between the first energy absorbing member and the power source; and a bracket extending from a bottom of the power source along a vehicle width direction, the bracket being fixed to the second energy absorbing member, wherein the first energy member, the rocker, and the bracket are fixed to each other.

5 Claims, 4 Drawing Sheets

VEHICLE BODY LOWER STRUCTURE

CROSS-REFERENCE TO RELATED APPLICATION

This application claims priority to Japanese Patent Application No. 2020-006329 filed on Jan. 17, 2020, the contents of which are hereby incorporated by reference into the present application.

TECHNICAL FIELD

The technique disclosed herein relates to a vehicle body lower structure. The technique particularly relates to a vehicle body lower structure including a pair of rockers and a power source arranged between the rockers.

BACKGROUND

In electric vehicles, a power source configured to supply power to a traction motor may be arranged between a pair of rockers. The power source may be a battery, a fuel cell, or the like. The pair of rockers is a pair of frames respectively extending along a front-rear direction of a vehicle body at lower lateral parts of the vehicle body. The rockers may also be referred to as "side sills".

In order to protect the power source from an impact of lateral collision to the lateral part of the body, a member (energy absorbing member) configured to absorb impact energy caused by lateral collision may be arranged lateral to the power source. Japanese Patent Application Publication Nos. 2013-256265 and 2019-018760 describe examples of such an energy absorbing member. The energy absorbing member described in Japanese Patent Application Publication No. 2013-256265 extends along a front-rear direction of a vehicle body and is coupled to a rocker and a power source. The energy absorbing member described in Japanese Patent Application Publication No. 2019-018760 is arranged in a rocker. Hereafter, an energy absorbing member may be referred to as "EA member" for convenience of description.

SUMMARY

There are a variety of types of vehicles having different widths. If a rocker and a power source are connected to each other with a single EA member, employing one type of power source in a variety of types of vehicles having different widths requires preparation of a variety of types of EA members depending on the widths of vehicles, which results in cost increase. The present disclosure provides art that reduces costs that are required for employing one type of power source in a variety of types of vehicles having different widths.

A vehicle body lower structure may comprise: a rocker arranged at a lower lateral part of a vehicle body and extending along a front-rear direction of the vehicle body; a power source arranged adjacent to the rocker; a first energy absorbing member arranged under the rocker; a second energy absorbing member arranged between the first energy absorbing member and the power source; and a bracket (a supporting plate) extending from a bottom of the power source along a vehicle width direction, the bracket being fixed to the second energy absorbing member, wherein the first energy member, the rocker, and the bracket are fixed to each other.

In the vehicle body lower structure disclosed herein, two EA members (the first EA member and the second EA member) are arranged between the power source and the rocker. Selecting the first EA member depending on a width of a vehicle allows a one type of power source and a one type of second EA members to be attached to a variety of types of vehicles having different widths. Dividing the EA member can downsize a portion of the EA member to be selected depending on widths of vehicles. This can reduce costs required for employing the one type of power source in a variety of types of vehicles having different widths.

Arranging the two EA members between the power source and the rocker may make a structure for supporting the power source weaker. To address this, the bracket is arranged under the power source, and the bracket is fixed to the first EA member and the second EA member. Further, the first EA member, the rocker, and the bracket are fixed to each other. This structure allows the power source to be supported firmly by the rockers.

The vehicle body lower structure disclosed herein may further comprise a reinforcement member arranged in the rocker, wherein the reinforcement member, the first energy absorbing member, the rocker, and the bracket are fixed to each other. The vehicle body lower structure disclosed herein may further comprising a collar penetrating an upper plate of the first energy absorbing member, a lower end of the collar being in contact with a lower plate of the first energy absorbing member, and an upper end of the collar being in contact with the rocker; wherein the rocker, the reinforcement member, the first energy absorbing member, and the bracket are fixed to each other with a bolt passing through the collar.

Details and further improvements of the technique disclosed herein will be described in Detailed Description below.

DETAILED DESCRIPTION

Figure 1:
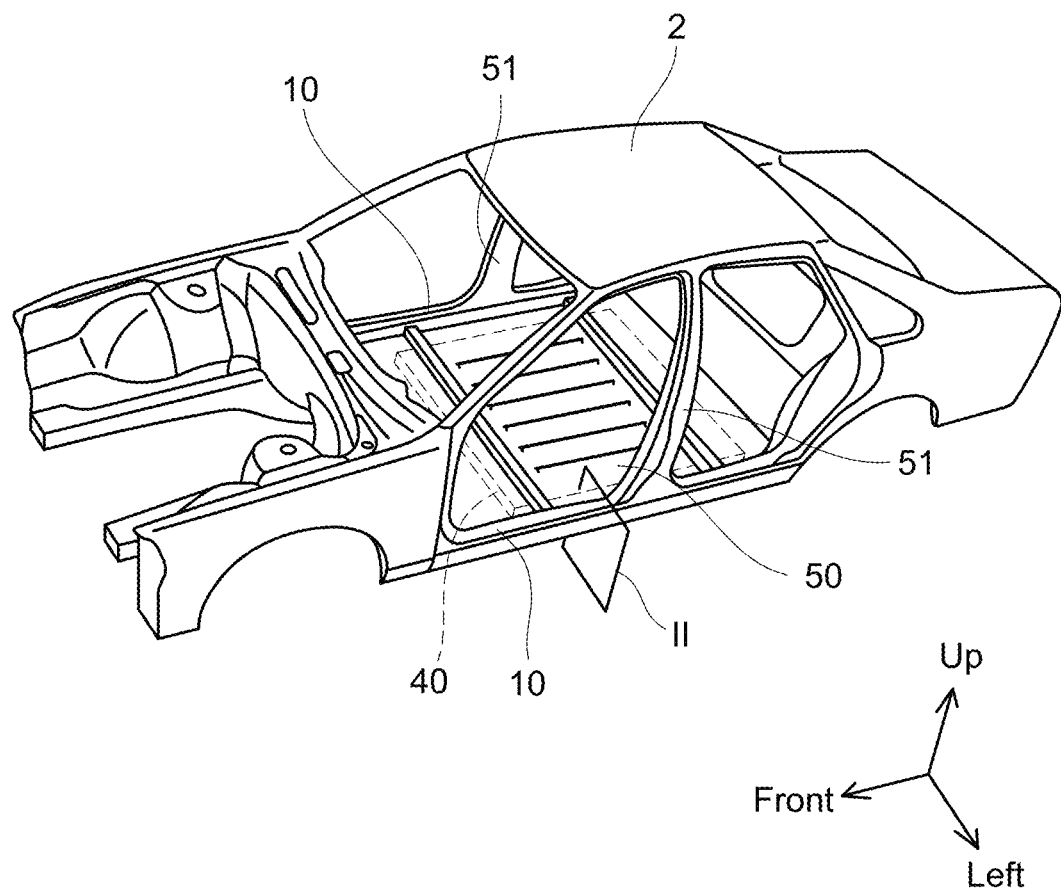
FIG. 1 is a perspective view of a vehicle body.

With reference to the drawings, a vehicle body lower structure 3 of an embodiment will be described. FIG. 1 shows a perspective view of a vehicle body 2. In the coordinate system of FIG. 1, "Left" indicates "left" when the vehicle body is seen from its rear to its front. The "Left" in the coordinate system has the same meaning in all of the drawings.

The vehicle body 2 includes a pair of rockers 10. The pair of rockers 10 are respectively arranged in lower lateral parts of the vehicle body 2 in a vehicle width direction. Each of the rockers 10 has an elongated shape and extends along a vehicle front-rear direction. Lower ends of center pillars 51 are respectively connected to the rockers 10 at vicinities of centers the rockers 10 in a longitudinal direction of the rockers 10. The pair of rockers 10 and the center pillars 51 are a type of frame that provides strength required for the vehicle body 2. The rockers 10 are each formed by press working operations for a metal plate (typically, a steel plate).

A battery pack 40 and a floor panel 50 are arranged between the pair of rockers 10. In other words, the battery pack 40 and the floor panel 50 are arranged adjacent to each of the rockers 10. The battery pack 40 includes a large number of battery cells. The battery cells are connected in series and configured to produce high-voltage power. The battery pack 40 (the battery cells) is configured to supply electric power to an electric traction motor (not shown).

The floor panel 50 corresponds to a floor of a cabin. Ends of the floor panel 50 in the vehicle width direction are respectively fixed to the pair of rockers 10. The battery pack 40 is arranged under the floor panel 50. Although details will be described later, energy absorbing members (not shown in FIG. 1) are arranged respectively along the rockers 10, and the battery pack 40 is supported by the pair of rockers 10 via the energy absorbing members. The battery pack 40 may also be supported by the rockers 10 via the floor panel 50 as well as via the energy absorbing members.

The energy absorbing members are arranged on both sides of the battery pack 40 in the vehicle width direction. As described above, the energy absorbing member(s) will be referred to as EA member(s) for convenience of description.

Figure 2:
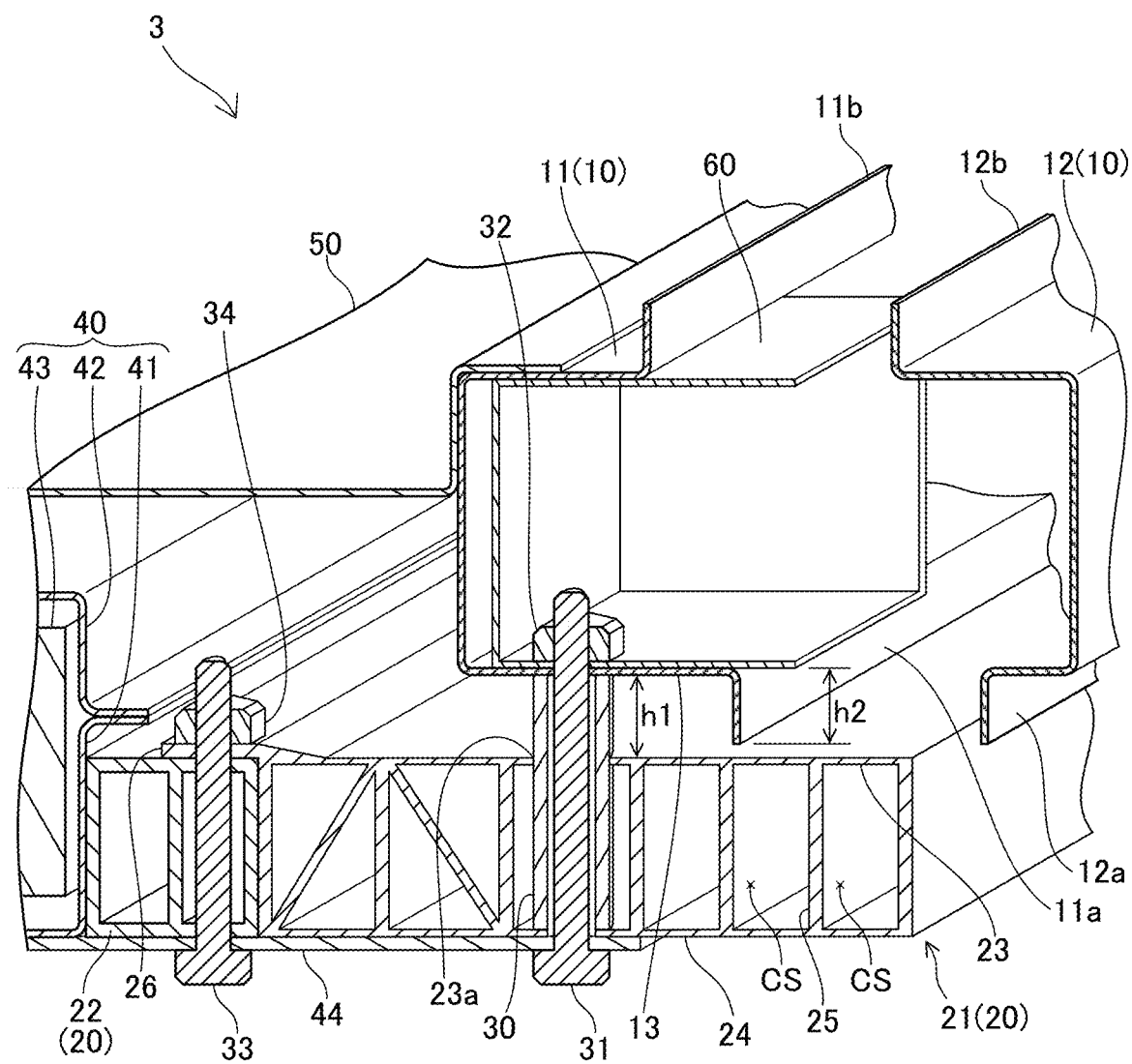
FIG. 2 is a cross-sectional view of the vehicle body cut along a plane II in FIG. 1.
Figure 2:
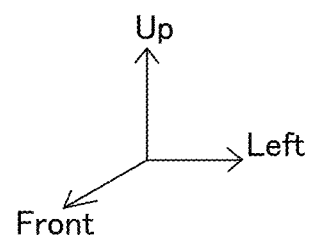

FIG. 2 shows a cross section of the vehicle body 2 cut along a plane II in FIG. 1. FIG. 2 shows a left part of the lower structure 3 of the vehicle body 2. As described above, the battery pack 40 is fixed to the rockers 10 via the energy absorbing members 20 (EA members 20) at lower right and lower left lower parts of the vehicle body 2. The left part of the lower structure 3 of the vehicle body 2 will hereinafter be described. The vehicle body 2 is symmetrical with respect to the right-left direction, thus the right part of the vehicle body 2 has the same structure as that of FIG. 2. In other words, the vehicle body lower structure 3 of the embodiment includes the pair of rockers 10 and the pair of EA members 20, and each of the EA members is arranged along corresponding one of the rockers 10. Hereinafter, one of the rockers 10 that is arranged at the left part of the vehicle body 2 (left rocker 10) and one of the EA members 20 that is fixed to this rocker 10 will be described.

The battery pack 40 includes a lower cover 41, an upper cover 42, and a plurality of battery cells 43. A container is configured by the lower cover 41 and the upper cover 42, and the plurality of battery cells 43 is housed within the container. Each of the lower cover 41 and the upper cover 42 is provided with a flange, and the container is configured by the flanges of the lower cover 41 and the upper cover 42 being joined.

The rockers 10 are configured of a rocker inner panel 11 and a rocker outer panel 12. The rocker inner panel 11 has a square U-shape (a channel shape) and is disposed with the U shape lying down on its side. The rocker inner panel 11 includes a lower flange 11a and an upper flange 11b. The lower flange 11a extends downward from a lower edge of the lying U-shape of the rocker inner panel 11. The upper flange 11b extends upward from an upper edge of the lying U-shape of the rocker inner panel 11. The rocker outer panel 12 has the same shape as the rocker inner panel 11. The rocker outer panel 12 includes a lower flange 12a and an upper flange 12b, and the lower flange 12a and the upper flange 12b respectively face the lower flange 11a and the upper flange 11b of the rocker inner panel 11. The lower flanges 11a, 12a are welded to each other, and the upper flanges 11b, 12b are welded to each other, which results in the rocker 10 having a hollow rectangular tube shape. To help understanding, FIG. 2 depicts the rocker outer panel 12 apart from the rocker inner panel 11.

A bulkhead 60 (a reinforcement member) is arranged in the rocker 10. The bulkhead 60 is a reinforcement member for enhancing strength of the rocker 10. The bulkhead 60 is attached to inside of the rocker inner panel 11 before the rocker inner panel 11 and the rocker outer panel 12 are fixed to each other. The bulkhead 60 is fixed to the rocker inner panel 11 by welding or with a bolt (not shown). The bulkhead 60 will be described below. A nut 32 is fixed to inside of the bulkhead 60. The nut 32 is fixed to the rocker inner panel 11 by welding.

The EA member 20 is configured of a first EA member 21 and a second EA member 22. The first EA member 21 is arranged under the rocker 10. The second EA member 22 is arranged between the first EA member 21 and the battery pack 40. The first EA member 21 is fixed to the rocker 10. The second EA member 22 is coupled not only to the first EA member 21 but also to the battery pack 40.

The EA member 20 (each of the first EA member 21 and the second EA member 22) has a hollow rectangular tube shape. The EA member 20 is configured to absorb collision energy caused by a lateral collision to the vehicle to protect the battery pack 40. The EA member 20 is configured to absorb the collision energy by being crushed in the vehicle width direction by an impact of the collision. Although the rocker 10 also contributes to absorption of the collision energy, the rocker 10 alone may be insufficient to absorb all the collision energy on its own. To address this, the hollow EA member 20 is arranged along the rocker 10.

Strength of the EA member 20 is predetermined, for example, by simulation such that the EA member 20 can effectively absorb the collision energy. An inner space of the first EA member 21 is partitioned into several cell spaces CS by a plurality of partition plates 25 which connects an upper plate 23 and a lower plate 24 to each other. The strength of the EA member 20 can be adjusted by appropriately selecting the number and/or thicknesses of the partitions 25. The strength of the EA member 20 is set lower than at least strength of the battery pack 40.

As described above, the first EA member 21 is arranged under the rocker 10. Meanwhile, the rocker 10 is provided with the lower flange 11a (12a) extending downward from a bottom plate 13 of the rocker 10. The first EA member 21 needs to be arranged such that it can avoid interference with the lower flange 11a (12a). If the first EA member 21 is divided into an inner portion (closer to the center of the vehicle in the vehicle width direction) and an outer portion with respect to the lower flange 11a (12a), the structure of the EA member becomes complex. In the vehicle body lower structure 3 of the embodiment, the interference between the first EA member 21 with the lower flange 11a (12a) can be avoided by a collar 30 being arranged between the first EA member 21 and the rocker 10. Arranging the first EA member 21 below the lower flange 11a (12a) enables the first EA member 21 to have a simple shape and extend to a position that is on outer side relative to the lower flange 11a (12a) in the vehicle width direction.

The collar 30 is a metal cylinder. In other words, the collar 30 is a spacer configured to secure a clearance between the rocker 10 and the first EA member 21. As shown in FIG. 2, a height h1 of the collar 30 above the first EA member 21 is greater than a height h2 of the lower flange 11a (12a). The collar 30 secures a clearance of distance h1 between the bottom plate 13 of the rocker 10 and the upper plate 23 of the first EA member 21. Because the height of the lower flange 11a (12a) is h2 (<h1), the lower flange 11a (12a) does not interfere with the first EA member 21. Thus, a simple rectangular tube shape can be employed as the shape of the first EA member 21, manufacturing costs for the EA member 21 can thereby be reduced.

A structure around the collar 30 will be described. The collar 30 penetrates a hole (a through hole 23a) provided in the upper plate 23 of the first EA member 21. An upper end of the collar 30 is in contact with a lower surface of the bottom plate 13 of the rocker 10. A lower end of the collar 30 is in contact with an upper surface of the lower plate 24. The first EA member 21, the rocker 10, and the bulkhead 60 are joined together and fixed to each other with the nut 32 and a bolt 31 passing through the collar 30.

When the battery pack 40 vibrates up and down while the vehicle is running, the collar 30 also vibrates up and down, and hence a vibration load is applied to the rocker 10 in an up-down direction. A deformation of the rocker 10 caused by the vibration load applied from the collar 30 is small because the bulkhead 60 and the bottom plate 13 are arranged between the collar 30 and the nut 32.

A support plate 44 extends outward from a lower surface of the battery pack 40 in the vehicle width direction. The support plate 44 and the first EA member 21 are also joined together and fixed to each other with the bolt 31 and the nut 32. The battery pack 40 can be fixed firmly to the EA member 20 by fixing the support plate 44 extending from the battery pack 40 to the first EA member 21.

A coupling structure of the first EA member 21 and the second EA member 22 will be described. A flange 26 extends from an end of the upper plate 23 of the first EA member 21 toward the vehicle center. The second EA member 22 is fixed to the flange 26 of the first EA member 21 with a bolt 33 and a nut 34. The support plate 44 extending from the battery pack 40 is also fixed to the second EA member 22 with the bolt 33. The second EA member 22 is held and fixed between the flange 26 of the first EA member 21 and the support plate 44 of the battery pack 40. The second EA member 22 is bonded to a side surface of the lower cover 41 of the battery pack 40. The battery pack 40 and the second EA member 22 are coupled firmly to each other with adhesive material and the bolt 33.

The EA member 20 is divided into the first EA member 21 which is fixed to the rocker 10 and the second EA member 22 which is bonded to the battery pack 40. The second EA member 22 is detachable from the first EA member 21. The EA member 20 can be applied to a variety of vehicles having different widths by selecting a first EA member 21 having an appropriate width from among a variety of first EA members having different widths and combining the selected first EA member 21 with the second EA member 22.

Figure 3:
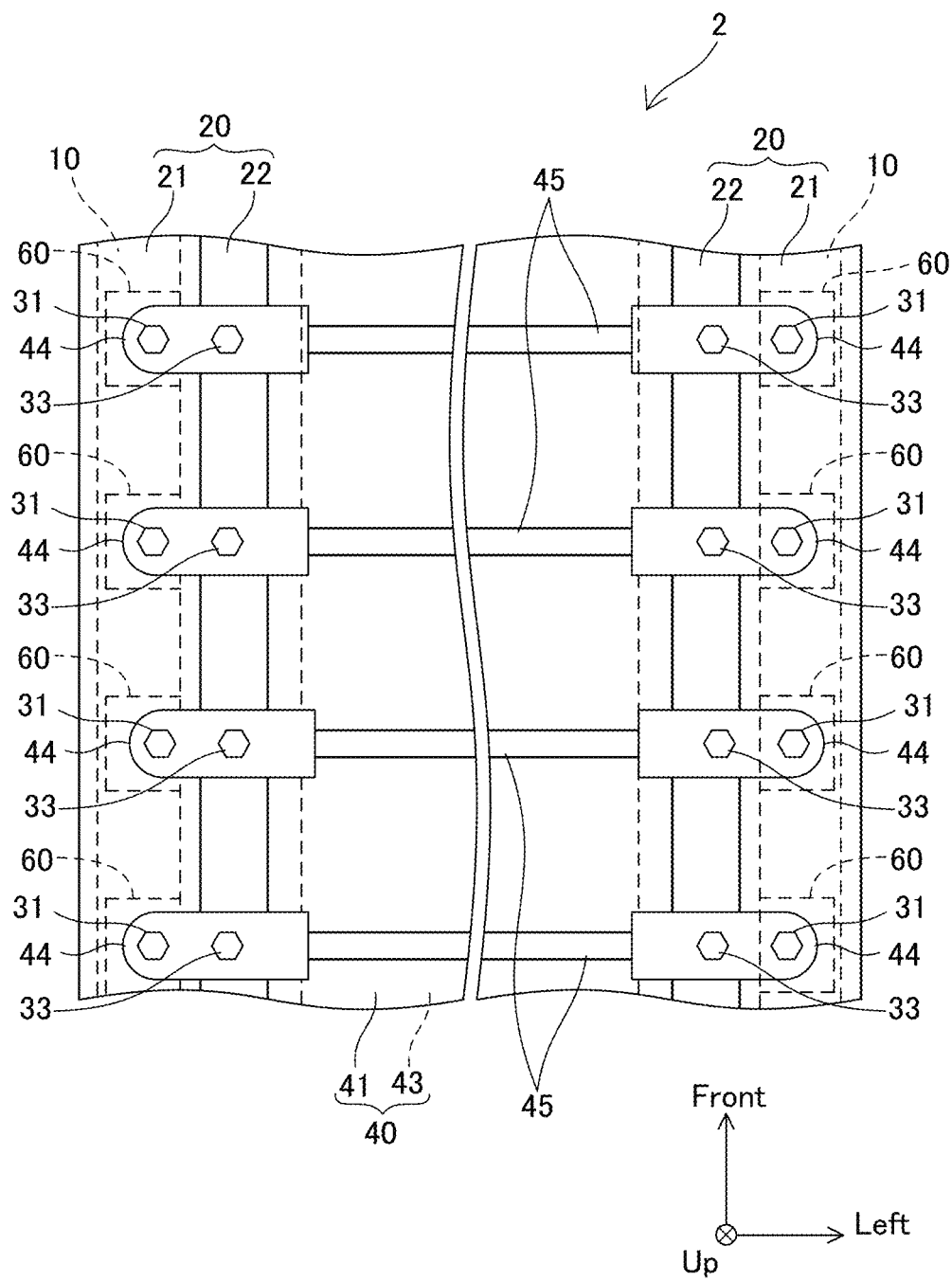
FIG. 3 is a bottom view of the vehicle body.

FIG. 3 shows a bottom view of the vehicle body 2. The EA member 20 (the first EA member 21) and the rocker 10 are fixed together with a plurality of bolts 31 arranged in the front-rear direction of the vehicle. As in FIG. 2, the plurality of bolts 31 passes through a corresponding collar 30 and fixes the first EA member 21 to the rocker 10. The EA member 20 (the first EA member 21) and the rocker 10 are connected firmly to each other with a small number of bolts because they are joined together with the bolts. In FIG. 3, the collars 30 are omitted.

A plurality of bulkheads 60 is arranged in each of the rockers 10 along the front-rear direction of the vehicle. Each of the bulkheads 60 is also fixed together with a corresponding EA member 20 (the first EA member 21) with the bolts 31. Each single bolt 31 fixes the EA member 20 (the first EA member 21) to the rocker 10 and also fixes one of the bulkheads 60 to the rocker 10. This structure is simple and enables weight reduction as compared to a structure in which the EA member 20 and the reinforcement members 60 are separately fixed to the rocker 10.

A plurality of support plates 44 extending from the battery pack 40 is arranged along the front-rear direction of the vehicle. Each of the plurality of support plates 44 extends outward in the vehicle width direction from the battery pack 40. Each of the support plates 44 is fixed to a corresponding EA member 20 (corresponding first EA members 21 and second EA members 22) with the bolts 31, 33.

Crossmembers 45 extending in the vehicle width direction are provided on the lower cover 41 of the battery pack 40. The crossmembers 45 are elongated protrusions provided on the lower cover 41. Each of the support plates 44 is connected to an end of a corresponding crossmember 45. The strength of connection between the battery pack 40 and the EA members 20 is enhanced by attaching the support plates 44 to the ends of the crossmembers 45 and fixing the support plates 44 to the EA member 20.

The bulkheads 60 will be described. Each bulkhead 60 is formed by bending one metal plate. Each bulkhead 60 is also fixed together with the corresponding EA member 20 (the corresponding first EA member 21) with the bolt 31. The bulkheads 60 are efficiently fixed by being fixed together with the EA members 20.

Figure 4:
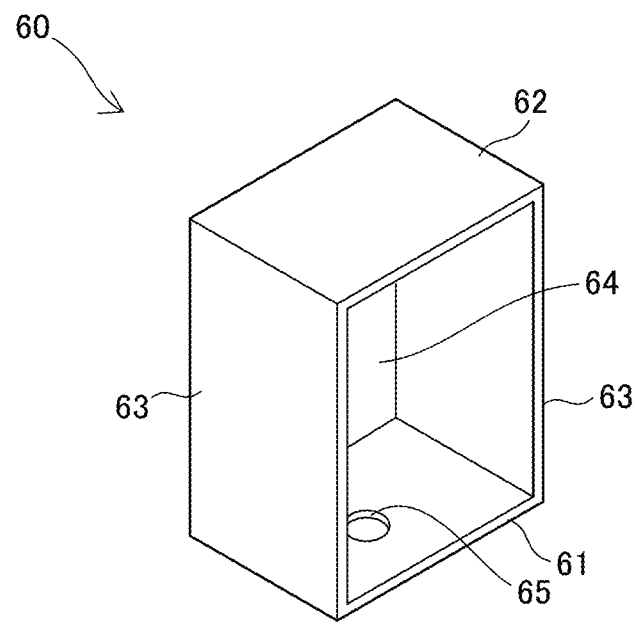
FIG. 4 is a perspective view of a bulkhead (a reinforcement member).

FIG. 4 shows a perspective view of the bulkhead 60. The bulkhead 60 is configured of a bottom plate 61, a top plate 62, a pair of side plates 63, and a back plate 64. A through hole 65 is provided in the bottom plate 61. The bolt 31 passes through the through hole 65. The nut 32 shown in FIG. 2 is welded to the bottom plate 61 such that a center line of the nut 32 coincides with a center line of the through hole 65. The nut 32 is omitted from FIG. 4.

The bulkhead 60 is attached to the inside of the rocker inner panel 11 before the rocker inner panel 11 and the rocker outer panel 12 are fixed to each other to form the rocker 10.

The EA member 20 is divided into the second EA member 22 which is fixed to the battery pack 40 and the first EA member 21 which is fixed to the rocker 10. Selecting the first EA member 21 depending on a width of a vehicle allows a one type of battery pack 40 and a one type of second EA member 22 to be attached to a variety of types of vehicles having different widths.

The relation between the EA member 20 and the support plate 44 will be supplementarily described. The support plate 44 is fixed to the lower surface of the battery pack 40 and extends outward in the vehicle width direction. The support plate 44 is fixed to the second EA member 22. The second EA member 22 is held between the support plate 44 and the flange 26 of the first EA member, and fixed to the support plate 44 and the flange 26 of the first EA member 26 with the bolt 33 and the nut 34.

The support plate 44 is also fixed to the first EA member 21 and the rocker 10. The support plate 44 is fixed to the first EA member 21 and the rocker 10 with the bolt 31 and the nut 32. The bulkhead 60 is arranged in the rocker 10, and hence the support plate 44 is fixed not only to the first EA member 21 and the rocker 10 but also to the bulkhead 60.

The through hole 23a is provided in the upper plate 23 of the first EA member 21, and the cylindrical collar 30 passes through the through hole 23a. The support plate 44, the first EA member 21, the rocker 10, and the bulkhead 60 are fixed to each other with the nut 32 and the bolt 31 which passes through the collar 30.

Arranging the two EA members (the first EA member 21 and the second EA member 22) between the battery pack 40 and the rocker 10 may make the structure for supporting the battery pack 40 weaker. To address this, the support plate 44 is arranged under the battery pack 40, the support plate 44 is fixed not only to the first EA member 21 and the second EA member 22 but also to the first EA member 21 and the rocker 10. This structure allows the battery pack 40 to be supported firmly by the rocker 10.

Points to be noted relating to the art described in the embodiment will be described. The EA member 20 (the first EA member 21 and the second EA member 22) cut along planes perpendicular to the front-rear direction of the vehicle are identical regardless of the cutting positions along the front-rear direction. The EA member 20 (the first EA member 21 and the second EA member 22) may be formed by extrusion molding of metal (typically, aluminum).

One bulkhead 60 may be fixed to the rocker 10 with single bolt 31. Alternatively, one bulkhead 60 may be fixed to the rocker 10 with a plurality of bolts. Each of the bolts that fixes one bulkhead 60 may pass through corresponding one of the collars 30, and the bolts may fix the EA member 20 to the rocker 10 via the collars 30. Single support plate 44 may be fixed to single bulkhead 60 with a plurality of bolts. The support plate 44 corresponds to an example of a bracket.

The battery pack 40 is an example of "power source". The battery pack houses the plurality of battery cells. The power source arranged between the pair of rockers 10 is not limited to the battery pack 40. The power source may be a device housing fuel cells or a device housing a capacitor.

The EA member 20 (the first EA member 21 and the second EA member 22) is a hollow beam having a rectangular tube shape. Therefore, "the first EA member" may also be termed a "the first hollow beam", and "the second EA member" may also be termed "the second hollow beam".

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A vehicle body lower structure comprising:
   a rocker arranged at a lower lateral part of a vehicle body and extending along a front-rear direction of the vehicle body;
   a power source arranged adjacent to the rocker;
   a first energy absorbing member arranged under the rocker;
   a second energy absorbing member arranged between the first energy absorbing member and the power source; and
   a bracket extending from a bottom of the power source along a vehicle width direction, the bracket being fixed to a lower surface of the second energy absorbing member,
   wherein
   the first energy member, the rocker, and the bracket are fixed to each other.

2. The vehicle body lower structure of claim 1, further comprising a reinforcement member arranged in the rocker,
   wherein the reinforcement member, the first energy absorbing member, the rocker, and the bracket are fixed to each other.

3. The vehicle body lower structure of claim 2, further comprising a collar penetrating an upper plate of the first energy absorbing member, a lower end of the collar being in contact with a lower plate of the first energy absorbing member, and an upper end of the collar being in contact with the rocker;
   wherein the rocker, the reinforcement member, the first energy absorbing member, and the bracket are fixed to each other with a bolt passing through the collar.

4. The vehicle body lower structure of claim 1, wherein the first energy absorbing member and the second energy absorbing member are hollow beams.

5. The vehicle body lower structure of claim 1, wherein the bracket horizontally extends from the bottom of the power source along the vehicle width direction.

* * * * *